United States Patent
Pater et al.

(10) Patent No.: US 10,234,318 B2
(45) Date of Patent: Mar. 19, 2019

(54) DOSING CAP

(71) Applicant: Weener Plastics Netherlands B.V., Tilburg (NL)

(72) Inventors: Marcel Pater, Doorn (NL); Willem Ramon, Woerden (NL); Lenny Marita Ellenkamp-Van Olst, Doetinchem (NL)

(73) Assignee: Weener Plastics Netherlands B.V., Tilburg (NL)

( * ) Notice: Subject to any disclaimer, the term of this patent is extended or adjusted under 35 U.S.C. 154(b) by 0 days.

(21) Appl. No.: 15/535,542

(22) PCT Filed: Dec. 21, 2015

(86) PCT No.: PCT/NL2015/050892
§ 371 (c)(1),
(2) Date: Jun. 13, 2017

(87) PCT Pub. No.: WO2016/105189
PCT Pub. Date: Jun. 30, 2016

(65) Prior Publication Data
US 2017/0336234 A1 Nov. 23, 2017

(30) Foreign Application Priority Data
Dec. 22, 2014 (NL) .................................... 2014031

(51) Int. Cl.
*G01F 11/04* (2006.01)
*G01F 11/08* (2006.01)
(Continued)

(52) U.S. Cl.
CPC ............ *G01F 11/04* (2013.01); *G01F 11/082* (2013.01); *G01F 11/263* (2013.01);
(Continued)

(58) Field of Classification Search
CPC .......... G01F 11/04; G01F 11/02; G01F 11/08; G01F 11/082; G01F 11/263; G01F 5/005; G01F 5/16; G01F 11/286; G01F 13/006
(Continued)

(56) References Cited

U.S. PATENT DOCUMENTS 3,669,323 A * 6/1972 Harker .................. B65D 35/14
222/490
4,811,871 A * 3/1989 Wass ........................ B67C 9/00
222/212
(Continued)

FOREIGN PATENT DOCUMENTS

EP         0274256 A1   7/1988
WO     2005/049477 A2   6/2005

*Primary Examiner* — Lien Ngo
(74) *Attorney, Agent, or Firm* — Hoffmann & Baron, LLP

(57) ABSTRACT

A liquid dosing device for a container includes a dosing chamber having a front end and a back end. An outlet passage is located at the front end. A plunger is located in the dosing chamber, divides it in a front and a back space, and is moveable between a forward position in which the plunger closes off the outlet passage, and a backward position, in which the front space has a maximal volume. An inlet passage provides fluid communication between the front space and the container. A timer passage provides fluid communication between the container and the back space. A release passage, being greater than the timer passage, provides fluid communication between the back space and the container. A valve assembly at the release passage includes a valve seat located at the back end of the dosing chamber.

28 Claims, 5 Drawing Sheets

(51) Int. Cl.
  *G01F 11/26* (2006.01)
  *G01F 13/00* (2006.01)
  *G01F 15/00* (2006.01)
  *G01F 15/16* (2006.01)
  *G01F 11/28* (2006.01)

(52) U.S. Cl.
  CPC .......... *G01F 13/006* (2013.01); *G01F 15/005* (2013.01); *G01F 15/16* (2013.01); *G01F 11/286* (2013.01)

(58) Field of Classification Search
  USPC ........ 222/207, 477, 212, 213, 500, 501, 476
  See application file for complete search history.

(56) References Cited

U.S. PATENT DOCUMENTS

| | | | | |
|---|---|---|---|---|
| 5,014,881 | A * | 5/1991 | Andris | B05B 11/3033 |
| | | | | 222/207 |
| 5,918,776 | A * | 7/1999 | Atkinson | B65D 35/40 |
| | | | | 222/207 |
| 8,997,788 | B2 * | 4/2015 | Wozna | B05B 11/047 |
| | | | | 137/843 |
| 2012/0097714 | A1 * | 4/2012 | Hoefte | G01F 11/04 |
| | | | | 222/477 |
| 2013/0270301 | A1 | 10/2013 | Schoubben et al. | |

* cited by examiner

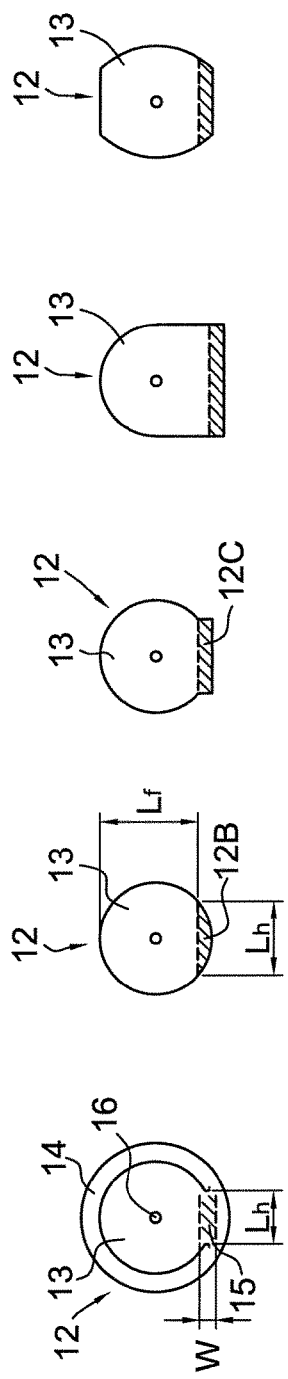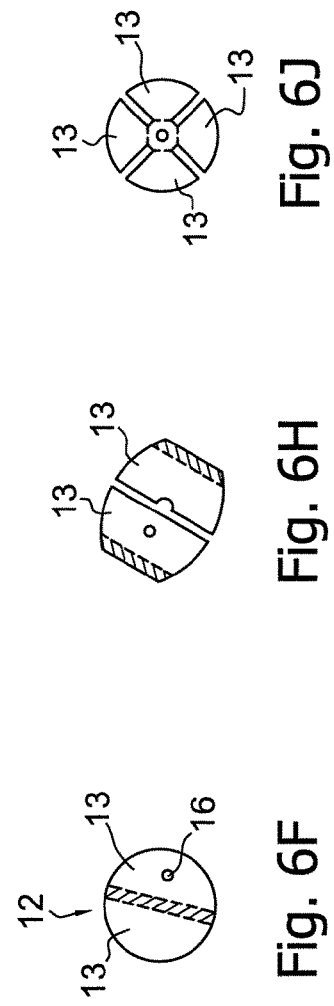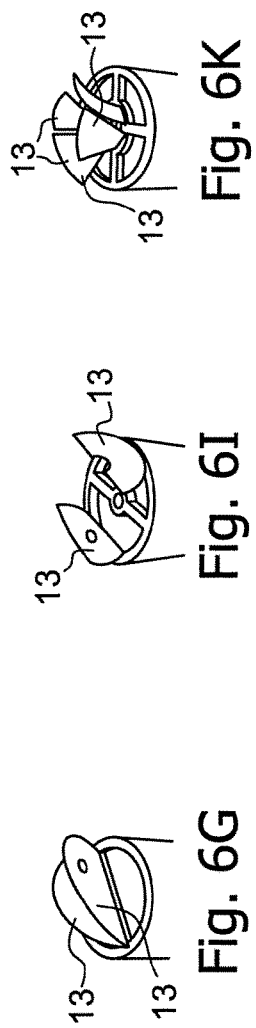

DOSING CAP

CROSS-REFERENCE TO RELATED APPLICATIONS

This application is the National Stage of International Application No. PCT/NL2015/050892 filed Dec. 21, 2015, which claims the benefit of Netherlands Application No. NL 2014031, filed Dec. 22, 2014, the contents of which is incorporated by reference herein.

FIELD OF THE INVENTION

The present invention relates to a liquid dosing device to be mounted on a container for dispensing doses of liquid from said container. The liquid dosing device may be used to dispense personal care products, liquid home and garden products, liquid food and beverage products, liquid laundry and homecare products (e.g. detergents and cleaning products), and liquid pharmaceutical products.

BACKGROUND OF THE INVENTION

EP 274 256 discloses a dosing device for dispensing liquid from a container, comprising an outlet passage for the liquid and an obturator adapted to be driven to block the outlet passage, once a quantity of liquid has been dispensed, by a restricted flow of liquid from the container into a space behind the obturator in a chamber in which the obturator is movable. A part of the device for defining the chamber comprises a movable wall portion adapted to take a first position, when liquid is being dispensed, in which access to said space behind the obturator is through a small aperture so as to provide a restriction of flow, or a second position in which there is a substantially larger aperture for liquid behind the obturator to fall back down in the container after dispensing. In one disclosed embodiment the chamber is defined by a cylinder and the obturator is constituted by a piston moveable in the cylinder. The moveable wall portion is constituted by a moveable plate that is integrally hinged to a rear edge part of the cylinder.

The moveable plate of the known dosing device of EP 274 256 hangs open when the container is in an upright position. When the container is turned upside down without immediately squeezing the container, the plate will in some events not move quickly enough to closing position whereby liquid will initially be able to flow in the space behind the piston through the large aperture instead of through the small aperture. This influences the timing of the dosing device and thus influences the dose that is dispensed. Consequently, the known dosing device does not provide consistent dosing. Another disadvantage is that the moveable plate does not open sufficiently when the container is not brought back to the upright position first. Thereby, quick successive dispensing of the same doses without bringing the container to the upright position first, is virtually impossible with the known dosing device.

The present invention has for an object to provide a dosing device that provides consistent dosing of liquid from the container.

SUMMARY OF THE INVENTION

This object is achieved by a dosing device comprising:
a dosing chamber, said dosing chamber having a front end and a back end opposite to the front end;
an outlet passage located at the front end of said dosing chamber;
a plunger located in the dosing chamber and dividing the dosing chamber in a front space and a back space, said plunger being moveable in the dosing chamber between a forward position in which the plunger closes off the outlet passage and the front space has a minimal volume, and a backward position, in which the front space has a maximal volume;
a dosing chamber inlet passage providing a fluid communication between the front space and the container in each position of the plunger, to allow liquid to flow from the container to the front space;
a timer passage associated with the dosing chamber providing a fluid communication between the container and said back space in each position of the plunger, to allow liquid to flow from the container to the back space;
a release passage associated with the dosing chamber, said release passage being greater than the timer passage and providing a fluid communication between the back space of the dosing chamber to allow liquid to flow from the back space to the container;
a valve assembly associated with the release passage, said valve assembly having a closed state in which the release passage is closed off and an open state in which said release passage is open and fluid is allowed to flow therethrough from the back space to the container, wherein the valve assembly comprises a valve seat located at the back end of the dosing chamber and a membrane located on a side of the valve seat facing away from the back space, said membrane being made of an elastic foil having a uniform thickness, said membrane having a stationary portion that is fixed with respect to the valve seat and at least one moveable flap which is connected to the stationary portion by a hinge portion, wherein said flap in said open state of the valve assembly is moved away from the valve seat and in said closed state of the valve assembly bears against the valve seat, and wherein the hinge portion is elastically flexed when the flap is moved away from the valve seat and is in a rest state when the flap bears against the seat.

The use of a membrane made of an elastic foil provides that the valve assembly can work without the use of gravity. The elastic property of the hinge portion and the relatively low weight of the flap made of foil material ensures that the flap in the rest state bears against the valve seat, independent of the orientation of the dosing device. Hence, also when the container is in an upright position the valve assembly is in a closed state. When the container is turned upside down the fluid in the container cannot inadvertently flow in the back space of the dosing chamber.

The dosing device will typically be used with squeeze type containers, or with containers in which the content is pressurized in another way. Only after the pressure on the container content is released, the flap will move away from the valve seat. The pressure difference between the back space and the container in which the pressure is released provides the force to overcome the elastic resistance against deformation of the hinge portion. The hinge portion which is made of the foil material is adapted to have only a moderate elastic resistance such that the moveable flap will move quickly and sufficiently away from the valve seat so as to provide the large release passage for the fluid from the back space towards the container. Thereby the plunger can quickly and fully return to the backward position, in which the device is ready for use again.

The valve assembly having a membrane of elastic foil according to the invention opens quickly and sufficiently, in particular also when the container is kept in an upside-down position between dispensing consecutive doses. It ensures that the plunger has fully returned to the backward position, before the relative underpressure in the container is removed by for example suction of air into the container via the outlet passage and inlet passage of the dosing chamber.

The dosing device can also be used with pouring type containers, hence containers which are turned upside down to some extent, sufficiently to pour the content out, but do not need to be squeezed to dispense the content therefrom. This type of container can for example be used advantageously for dosing a liquid detergent or herbicide. While pouring the liquid, the plunger is drawn forward to the forward position by the flow of liquid flowing from the chamber inlet passage to the chamber outlet passage until the plunger closes off the outlet passage. Such a container needs to be turned to an upright position to allow the plunger to return to the backward position. In an upright position of the container, the weight of the liquid in the backspace will force the membrane to open, and the liquid to flow to the container. The plunger simultaneously sinks back to the backward position. Because the membrane according to the invention opens quickly, the plunger returns quickly to the backward position and the container is quickly ready for another pouring action.

Another advantage of a membrane that is made of a foil is that it is able to compensate for irregularities or unevenness in the valve seat. The valve seat is often a plastic part made by injection moulding, wherein moulding defects, such as sinks or bumps, can arise. Also moulding tolerances may cause differences between different batches of valve seats. If the sealing of the valve assembly is defective, which might be the case with a hinging plate as known from EP 274 256 combined with the valve seat, the fluid will not only pass through the timer passage, but also through the leaking sealing of the valve assembly. Thereby the plunger will move quicker during dispensing. Obviously, within a production batch of valve seats, or in different production batches of valve seats, variations in the irregularities can occur. Using a hinging plate this leads to varying dosing characteristics within a batch or between different batches, which is undesirable. The foil proposed by the present invention is able to adapt to for example sinks or bumps, or deformations or other variations which form during the production process of the valve seat. Thereby the foil is better adapted to provide a good sealing with the valve seat than a hinging plate as known from EP 274 256 is and provides a more accurate and less varying dosing characteristic to the liquid dosing devices.

According to the invention the foil membrane is made separately from the dosing chamber and the associated valve seat. The stationary portion of the membrane is then fixed to the valve seat by a suitable fixing method. There are different ways the stationary portion of the membrane can be fixed in the dosing device, e.g. by ultrasonic welding or heat sealing or another welding method, or alternatively adhering. Also a mechanical fixation is possible such as e.g. clamping or by a pin-hole connection. It is also possible to lay the membrane in the injection mould for forming the valve seat, wherein the membrane is overmoulded while forming the valve seat.

The membrane can be made of a suitable foil made of polymer material. In the art such a plastic foil is also often referred to as a plastic film.

The membrane may be cut out of a foil sheet by some means, e.g. by punching or laser cutting, but it is noted that the invention is not limited to dosing devices having a membrane cut out of a foil sheet. It is for example also conceivable to use injection moulding to make the membrane.

The foil can be made from for example Polypropylene (PP), Polyethylene (PE), Polyethylene terephthalate (PET), or Polystyrene (PS), or a Thermoplastic elastomer (TPE).

It is also possible that the foil comprises a laminate of layers of one or more suitable materials.

The thickness of the foil for the membrane depends in general from the material selected.

In a preferred embodiment a polypropylene (PP) foil of about 50 μm is applied for the membrane.

In the mentioned practical embodiment the thickness of the foil is about 50 μm, but in other practical embodiments the thickness of the foil can range of from 30 to 80 μm, depending on the particular PP material used and depending on the particular application (e.g. type of liquid) for which the dosing device is going to be used.

A TPE (thermoplastic elastomer) foil may for some applications also be suitable for making the membrane. A TPE foil will in general have a greater thickness than a PP foil e.g. 100-500 μm to obtain a membrane with a similar functionality.

A PE foil may have a thickness of about 80-150 μm to obtain a membrane with a similar functionality.

In a preferred embodiment of the dosing device, the membrane comprises a single flap.

In a further preferred embodiment the hinge portion has a length of at least 3 mm, but in most practical embodiments will be at least 6 mm. The minimal length ensures that the hinge portion has enough resistance against torsion. Torsion at the hinge could cause that the flap is rotated and is not able to return properly to the closed state, which should be avoided.

In a practical embodiment of the dosing device the flap has a flap diameter and the hinge portion has a length that is about two thirds of the flap diameter. This ratio between flap diameter and length of the hinge portion provides that for the suitable foil materials as mentioned in the above, the risk of torsional deformation is avoided or at least highly reduced.

It was found that in a practical embodiment with a PP foil of about 50 μm thickness, the ratio ($L_h/L_f$) between the length $L_h$ of the hinge line and the length $L_f$ of the flap, measured in a direction perpendicular to the hinge line, should vary from 0.25 to 2.7, preferably 0.4 to 1.5, most preferably the range is within a range from 0.5 to 1.0, to ensure a proper functioning of the valve assembly.

Generally the valve assembly functions properly if:
the flap and hinge have enough strength to stay closed in neutral and top down position;
the flap and hinge provide enough flexibility to open up quickly and provide an opening to the release passage that is as large as possible;
the flap has enough strength to return to its closed position as quickly as possible;
the flap does not experience torsion and permanent deformation during normal use.

In a preferred embodiment of the dosing device according to the invention the timer passage comprises a cutout provided in the membrane. The cutout is in a preferred embodiment a timer opening formed as a hole.

said cutout may be located in the moveable flap. However, it is also possible to have a cutout that is located in the stationary portion of the membrane.

In a preferred embodiment the cutout provided in the membrane is invariant during normal use. A cutout that is invariant has a constant shape and size during normal use. This will ensure that the timing of the dosing device and thus the dosing is consistent during normal use.

The membrane could have one or a plurality of cutouts. A single cutout is preferred because the flow of liquid through it is larger than through a plurality of cutouts having an equivalent surface area. Furthermore a larger cutout is easier to produce in the foil. Furthermore one has wider tolerances in making a larger cutout in the foil.

The cutout can be made in the foil by different means, for example by punching, or by laser cutting.

In an alternative embodiment the timer passage may be integrated in the valve seat instead of in the membrane. Of course the timer passage should be provided in a portion of the valve seat that is not covered by the membrane.

In a further embodiment the valve seat is provided with the timer passage and the membrane has a cutout, e.g. a hole that is aligned with the timer passage.

In a further advantageous embodiment, the timer passage has a smaller diameter than the cutout in the membrane. This results in that the diameter of the timer passage in the valve seat determines the flow restriction and thus timing of the dosing device. An advantage is that for different dosing devices to be used with different liquids (having different viscosities) to be dispensed, valve seats with differently sized timer passages can be manufactured, whereas for all the different dosing devices the same membrane can be used.

In a further embodiment the valve seat has a support formation adapted to be a stop for the flap of the membrane, wherein the timer passage is provided in said support formation. The support formation may include a central body and at least one radial arm extending from the central body and connected to an outer ring of the valve seat, wherein the timer passage is provided in the central body.

This embodiment with a central body may have an advantage in injection moulding the valve seat, because the plastic can be injected at a central point. However, a support formation should not reduce the area of the release passage too much, so it is preferred to provide a support formation only at relatively large release passages.

In yet another embodiment the timer passage is provided in a dosing chamber wall.

In a possible embodiment of the liquid dosing device according to the invention the stationary portion, the movable flap and the hinge portion of the membrane are formed in one piece, wherein a contour of the flap and the hinge portion is provided by a cut in the membrane, and wherein the stationary portion comprises a ring shaped portion that circumvents the flap.

The above mentioned cut in the membrane can be made by different means, for instance by laser cutting or by a cutting tool.

In this embodiment a timer passage may be formed by a cutout in the ring shaped portion of the membrane or in the flap or in both.

The invention also relates to a closure cap attachable to a container in which a dosing device according to any one of the embodiments as described in the above is integrated.

The invention also relates to a container containing substance selected from the group of liquid personal care products, liquid home and garden products, liquid food and beverage products, liquid laundry and homecare products (e.g. detergents and cleaning products), and liquid pharmaceutical products, provided with a closure cap as mentioned.

The invention also relates to a squeeze type container provided with a liquid dosing device according to any one of the embodiments as described in the above.

The invention also relates to a pouring type container provided with a liquid dosing device according to any one of the embodiments as described in the above.

The invention also relates to a method for manufacturing a dosing device as described in the above.

The inventions also relates to a method for dispensing a liquid substance in which a liquid dosing device as described in the above is used.

The invention will be elucidated in the following detailed description with reference to the drawings.

BRIEF DESCRIPTION OF THE DRAWINGS

FIGS. 6A-6K illustrate several possible embodiments of the membrane for a dosing device according to the invention.

DETAILED DESCRIPTION OF THE INVENTION

Figure 1:
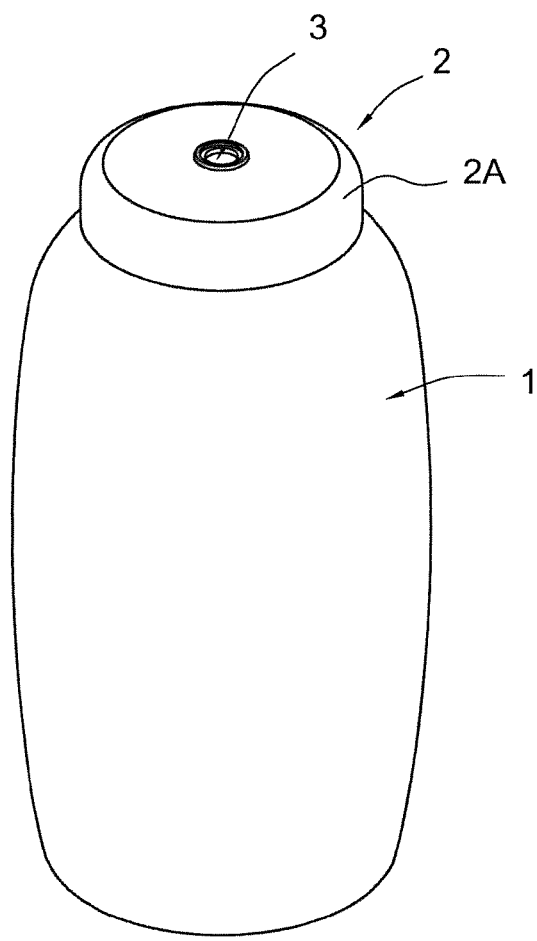
FIG. 1 shows a view in perspective of a container provided with a cap including an embodiment of a dosing device according to the invention.
Figure 2:
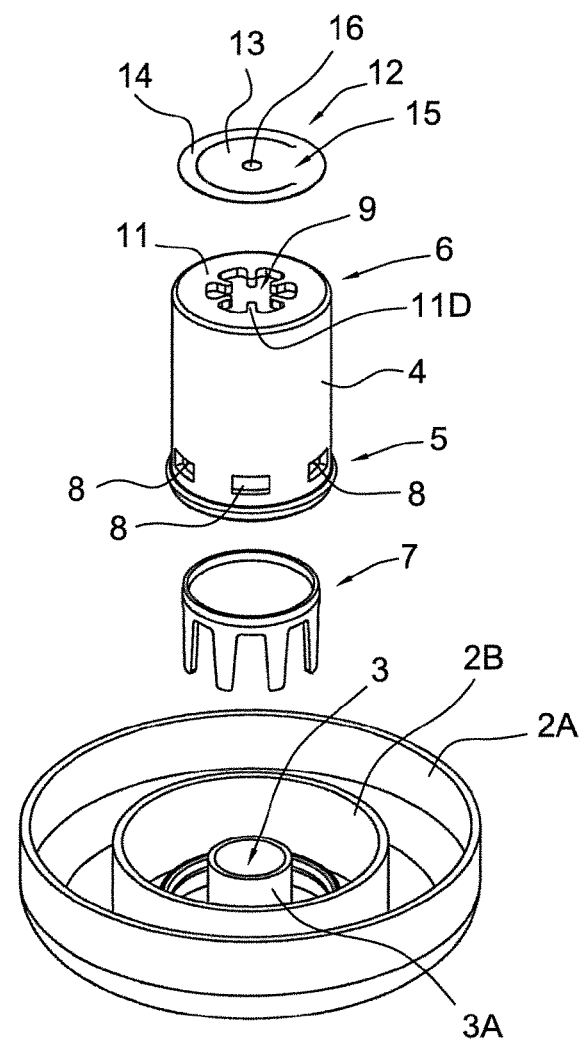
FIG. 2 shows an exploded view of a possible embodiment of a cap including a dosing device according to the invention.

In FIG. 1 is shown a container 1 containing a fluid. The container 1 has a neck portion defining an outlet for the container. As can be seen in FIG. 2 the closure cap 2 has an outer skirt 2A that forms the outer appearance of the cap, and an inner skirt 2B that is attached to the container 1 at a neck portion thereof, e.g. by means of a threaded connection or a snap connection. The closure cap 2 is adapted to close the outlet of the container 1 and selectively open said outlet.

As is shown in FIGS. 2-5 and 8 the closure cap 2 has an outlet passage 3 defined by a spout 3A.

The closure cap 2 furthermore comprises a dosing chamber 4. The dosing chamber 4 has a front end 5 and a back end 6 opposite to the front end 5. The outlet passage 3 is located at the front end 5 of said dosing chamber 4.

Figure 4:
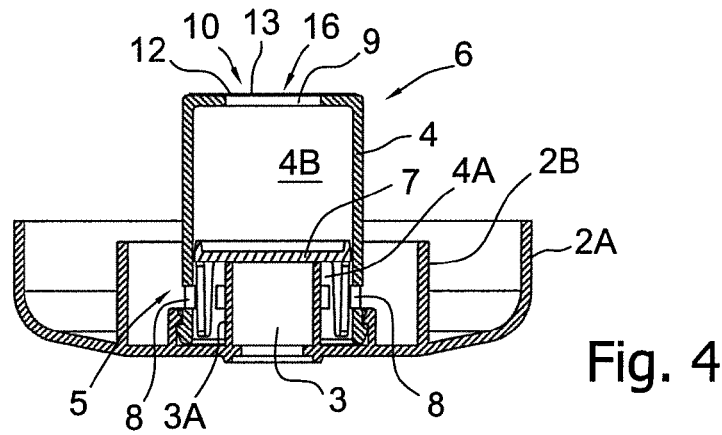
FIG. 4 shows the cross section of FIG. 3 with the plunger in a most forward position.
Figure 5:
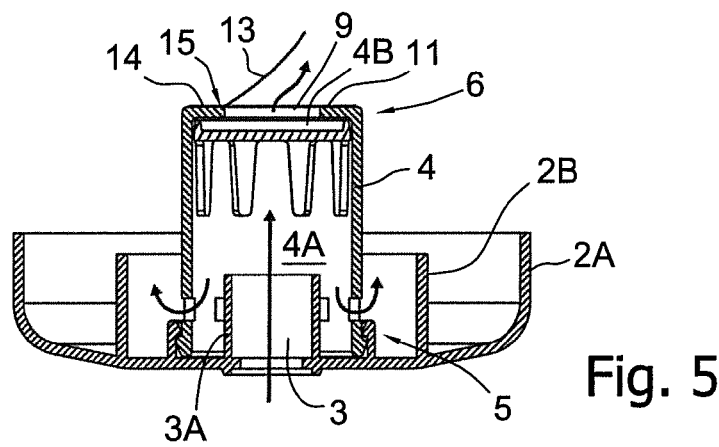
FIG. 5 shows the cross section of FIG. 3 with the plunger approaching a most backward position.

In the dosing chamber is located a plunger 7. The plunger 7 divides the dosing chamber 4 in a front space 4A and a back space 4B. The plunger 7 is moveable in the dosing chamber 4. The plunger 7 moveable between a forward position in which the plunger 7 closes off the outlet passage 3, as is shown in FIG. 4. In FIG. 5 is shown that the plunger 7 has almost reached a backward position. In the forward position the front space 4A has a minimal volume. In the backward position the front space 4A has a maximal volume.

Figure 3:
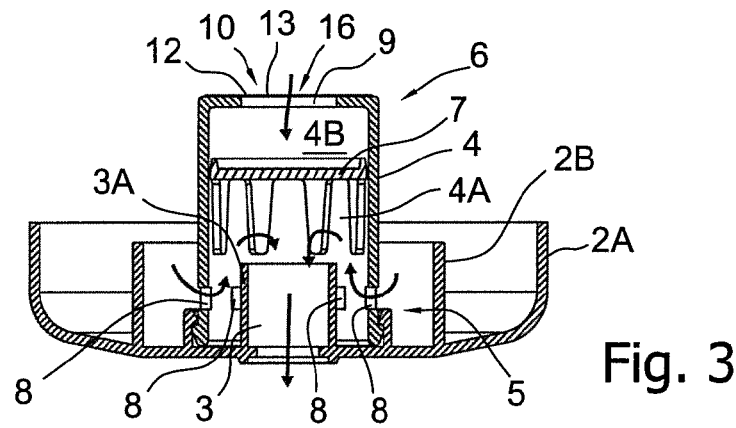
FIG. 3 shows a cross section of the dosing device according to the invention when dispensing.

The dosing chamber has a dosing chamber inlet passage 8. The inlet passage 8 provides a fluid communication between the front space 4A and the container 1 and allows liquid to flow from the container 1 to the front space 4A of the dosing chamber as is illustrated in FIG. 3. The inlet passage 8 is always open, independent of the position of the plunger 7 in the dosing chamber 4.

At the back end 6 of the dosing chamber 7 a release passage 9 is provided. The release passage 9 provides a fluid communication between the back space 4B of the dosing chamber 4 and the container 1.

At the release passage 9 a valve assembly 10 is provided. The valve assembly 10, which will be described in more detail further below, has a closed state in which the release passage 9 is closed off and an open state in which the release passage 9 is open. When the release passage 9 is open, fluid that is present in the back space 4B is allowed to flow through the release passage 9 to the container 1.

The valve assembly 10 includes a valve seat 11 located at the back end 6 of the dosing chamber 4. The valve assembly 10 furthermore includes a membrane 12 located on a side of the valve seat 11 facing away from the back space 4B. The membrane 12, of which an example is shown in FIG. 2, comprises a moveable flap 13 which in the mentioned open state of the valve assembly 10 is moved away from the valve seat 11 (cf. FIG. 5) and in the mentioned closed state of the valve assembly 10 bears against the valve seat 11 (cf. FIGS. 4 and 5). The membrane 12 furthermore comprises a stationary portion 14. The stationary portion 14 of the membrane 12 is fixed with respect to the valve seat 11.

The membrane 12 comprises a hinge portion 15 that connects the moveable flap 13 to the stationary portion 14.

The dosing chamber 4 has a timer passage 16 providing a fluid communication between the container 1 and the back space 4B. The timer passage 16 is in the embodiment shown in the figures provided in the membrane 12. The timer passage 16 allows liquid to flow from the container 1 to the back space 4B when the valve assembly 10 is in the closed state as is illustrated in FIG. 3. The timer passage 16 is considerably smaller than the release passage 9.

The valve seat 11 is manufactured by a suitable process such as for example injection moulding. The membrane 12 is intended to be made separately and then attached to the valve seat. Plastic foils or films are in practise usually made by an extrusion process or blow moulding processes. The membrane shapes can be punched out of extruded or blow moulded foil sheets. However, also other forming processes are thinkable for the membrane; for example of injection moulded foil.

The membrane 12 is made of an elastic foil having a uniform thickness. In a practical embodiment the foil is made of polypropylene (PP) having a thickness of about 50 μm. A practical thickness of a PP foil may lie within the range of 30-80 μm.

Also other suitable polymeric materials are conceivable to be used for the foil, such as polyethylene (PE), polyethylene terephthalate (PET), or polystyrene (PS).

In the art plastic foils as mentioned above are also referred to as plastic films.

Also an elastomer, for example a thermoplastic elastomer (TPE), can be a suitable material for the foil. A TPE foil is for the membrane function thicker than for example a PP or PE foil to provide a sufficient shape memory and bending capability to the foil. A feasible thickness for a TPE foil could lie in the range of 100-500 μm.

In use the dosing device operates as follows:

The plunger 7 is initially in the backward position. The valve assembly 10 is in the closed state. The container content is pressurized by the user. In a practical embodiment the container 1 is a squeeze type container, and the user pressurizes the content by squeezing the container body. The container 1 is usually held upside down during pressurizing.

The fluid flows from the container 1 through the inlet passage 8 into the front space 4A and through the outlet passage 3 (cf. FIG. 3). At the same time fluid flows from the container 1 into the back space 4B through the timer passage 16 and the plunger 7 moves through the dosing chamber 4 towards the front position (cf. FIG. 3). The speed at which the plunger 7 travels is mainly determined by the flow rate through the timer passage 16 and thus dependent on the size of the timer passage 16.

After a certain time the plunger 7 will abut the end face of the spout 3A and close the outlet passage 3, which state is shown in FIG. 4. Dispensing of fluid will then cease.

After dispensing of the dose of liquid has ceased, the pressure in the container 1 is released. In case of a squeeze type container the user may relieve the pressure on the container body and the container returns elastically to its original shape.

Relieving the pressure causes an underpressure in the container 1. A suckback effect will result which sucks air through the outlet passage 3 via the dosing chamber front portion 4A and the inlet passage 8 into the container 1, which is illustrated in FIG. 5.

A pressure difference between the container content and the back space 4B is also created. This pressure difference causes that the flap 13 of the membrane 12 is moved away from the valve seat 11 as is shown in FIG. 5. When the flap 13 moves away from the valve seat 11, the hinge portion 15 is elastically flexed.

When the flap 13 is moved away from the valve seat 11, fluid will flow from the back space 4B to the container 1 through the release passage 9 as is illustrated in FIG. 5. In case of a squeeze type container, where there is an underpressure, the fluid will be sucked back from the back space 4B to the container. In the meantime the plunger 7 will travel back from the front position (FIG. 4) to the backward position (FIG. 5). When the pressure difference between the container 1 and the back space 4B is removed, the flap 13 will move back to its position bearing against the valve seat 11 by the elastic property of the hinge portion 15. The mentioned pressure difference will be removed after a certain time due to the suction of air into the container 1 through the outlet passage 3 the front space 4A and the inlet passage 8.

The release passage 9 has such a dimension that fluid can flow quickly out of the back space 4B and that the plunger 7 can return quickly to the backward position. The structure of the membrane 12 including the flap 13 and the hinge portion 15 according to the invention ensure that there is a quick response to the pressure drop in the container 1 and the release passage 9 is quickly opened. By the quick response of the valve assembly 10 and the large release opening 9 it can be ensured that the plunger 7 will travel back to the backward position, before the valve assembly 10 closes again and the suckback has ended. It is thus ensured that the dosing device will always dispense the same dose and thus provides a consistent dosing.

The amount of liquid per dose is determined inter alia by the dimensions of the timer passage 16, the inlet passage 8, the outlet passage 3 and the chamber 4 dimensions in relation to the viscosity of the fluid.

The dosing device can also be used with a container 1 from which liquid is dispensed by pouring. The container 1 does not have to be squeezed or pressurized in another way in such an embodiment. The liquid is poured by turning the container upside down to some extent, whereby forced by gravity the fluid flows from the container through the inlet passage 8 into the front space 4A and out through the outlet passage 3.

The flow of liquid from the inlet passage 8 to the outlet passage 3 through the front space 4A (cf. FIG. 3) creates a suction force that sucks the plunger towards the front position. In the meantime liquid flows from the container into the backspace 4B through the timer passage 16. This flow is forced by an underpressure in the backspace 4B created by the movement of the plunger 7 (which increases the volume of the backspace 4B) and/or gravity.

When the plunger 7 is fully advanced into the forward position and the outlet passage 3 is blocked, the dispensing of liquid stops and the container has to be brought to an upright position such that fluid can flow out of the back space 4B into the container. This is forced by gravity and the weight of the liquid in the back space 4B forces the membrane 13 to move away from the valve seat. The plunger 7 will move back to the backward position forced by gravity because of its own weight and the weight of the liquid still present in the front space 4A.

The dosing device for a squeeze type container and for a pouring type container both basically have the same structure, which is described in the above, but their components may be shaped and dimensioned differently to optimize their respective performances.

In FIG. 2 an embodiment of the membrane 12 is shown in which the timer passage 16 is formed as an opening provided in the flap 13, in particular in the centre of the flap 13.

Figure 8:
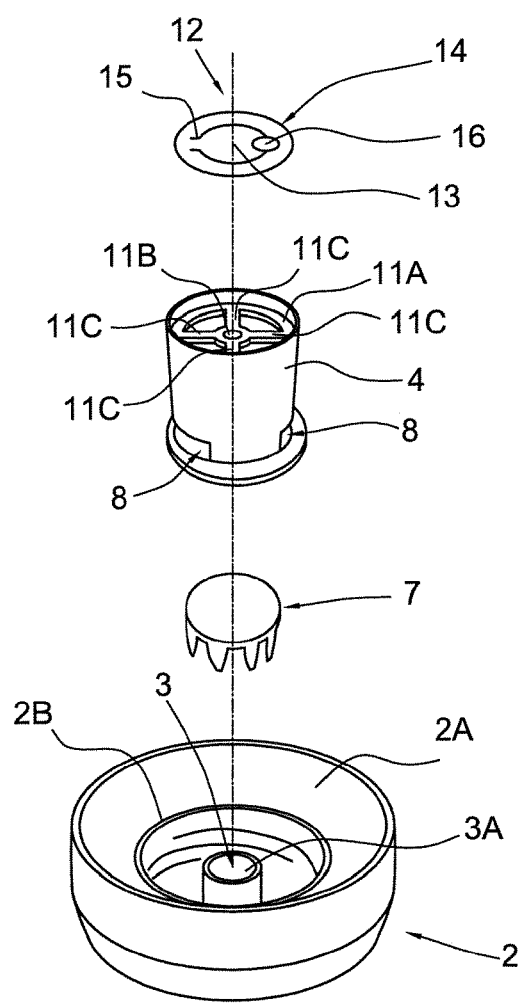
FIG. 8 shows an exploded view of another embodiment of the cap including a dosing device according to the invention.

In another embodiment of the membrane 12, the timer passage 16 is defined by a recess in the edge of the moveable flap 13 and a recess in the annular stationary portion 14 that surrounds the moveable flap 13, as is shown in FIG. 8.

It is also possible to have multiple timer openings.

In FIG. 6A the membrane 12 has a circular shaped foil and the contour of the moveable flap 13 is cut into the foil. In a practical embodiment the flap 13 may have a diameter of about 12 mm. Furthermore a timer opening 16 is punched, or formed otherwise, in the flap 13. The hinge portion 15 is formed by a connecting region narrowed with respect to the moveable flap 13.

In the practical embodiment of FIG. 6A, the hinge portion 15 may have length $L_h$, of about 6 mm. The width W of the hinge portion is preferably about 1-2 mm.

Also other embodiments of the membrane 12 are possible:

In FIG. 6B is shown a circular membrane 12, which has a segment 12B that is stationary and a flap that is connected to the stationary portion 12B by the hinge portion that is indicated by a dashed line.

In a practical embodiment of the membrane shown in FIG. 6B, in case it is made of a PP foil having a thickness of about 50 μm, as mentioned in the above, the flap diameter may be about 12 mm. The length of the hinge $L_h$ may than vary from 3 mm to 12 mm, but most preferably from 6-10 mm.

A membrane of PP foil having a thickness of about 50 μm that has a diameter of about 12 mm, a hinge length $L_h$ of about 8 mm and a flap length $L_f$ of about 10.5 mm functions well with for example a detergent to be dispensed from the dosing device.

In FIG. 6C is shown a membrane that has a generally circular flap with a bulge 12C formed on an edge portion, that includes the stationary portion and hinge portion.

In FIGS. 6D and 6E other shapes of the moveable flap 13 are illustrated.

In FIGS. 6F and 6G is illustrated an embodiment wherein the membrane is fixed in the middle and the membrane has two moveable flaps 13.

In FIGS. 6H and 6I is illustrated an embodiment wherein the membrane has two moveable flaps 13, which are each fixed at an outer region.

In FIGS. 6J and 6K is illustrated an embodiment wherein the membrane has four flaps 13, which are fixed in a centre region.

In the FIG. 6B the hinge seems to define a straight folding line (having a length $L_h$). However, it should be noted that in practise the hinge portion of the membrane preferably does not define a folding line, but a folding area with a certain width in which the foil is allowed to flex. The line shown in the figure is merely indicative for the area. The same applies mutatis mutandis for the embodiments shown in FIGS. 6C-6K.

The shape of the folding area is determined by the way and shape of the attachment (e.g. sealing) of the membrane to the valve seat, and by the shape of the flap area adjoining the attachment. The attachment may define a straight area, but may also define an area with a curvature, wherein the curvature direction may be corresponding to the one of the outer contour of the membrane, or may be curved in an opposite direction. If on the hinging area the membrane is attached at the outer ends to the valve seat, the membrane may find its own hinging area shape.

In the embodiment shown in FIG. 2, the valve seat 11 has support protrusions 11D extending from the edge of the opening 9 radially inward. In this particular embodiment of FIG. 2 there are six support protrusions 11D. The support protrusions D are only connected to the remainder of the valve seat 11 at their radial outer end.

An alternative of a valve seat 11 is shown in FIG. 8, wherein the valve seat 11 has a support formation. The support formation comprises an outer ring 11A, a central body 11B and radial arms 11C interconnecting the outer ring 11A and the central body 11B. The particular embodiment shown has four radial arms 11C which are distributed evenly, thus each have an angle of 90° with respect to the previous and consecutive arm 11C. The support formation 11A,11B, 11C forms a stop for the flap 13 of the membrane 12, such that the flap cannot move into the back space 4B. In the embodiment shown in FIG. 8 the central body 11B is provided with a through hole 11D, whereby the central body 11B effectively is a central ring.

In an advantageous embodiment the membrane 12 may have a central opening (not shown in FIG. 8, but shown in FIG. 2 and FIG. 6A), which is aligned with the through hole 11D in the central body 11C of the valve seat 11. Advantageously the central opening 16 in the membrane 12 is larger than the through hole 11D in the central body 11C, such that the central hole 11D effectively works as a timer passage. As the valve seat in general will be made of a form stable material, e.g. a suitable plastic, the size of the through hole 11D will be stable and the timer passage will be invariant over time.

Figure 7:
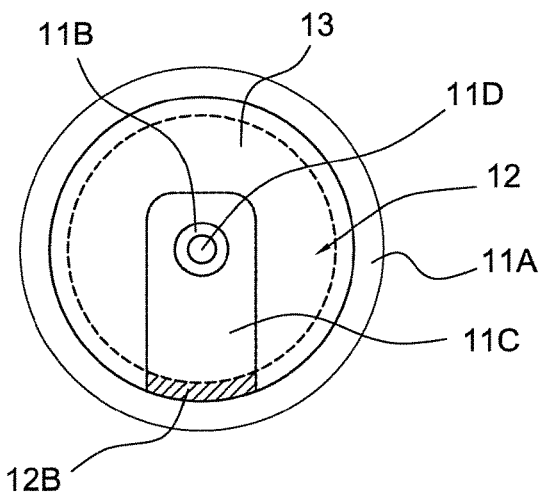
FIG. 7 shows in an elevational view a possible embodiment of a valve assembly for a dosing device according to the invention.

In FIG. 7 another variant is shown, where the membrane 12 is circular and has a central opening 13A. The membrane 12 is sealed with a circle segment 12B to an outer ring of the valve seat 11. The valve seat comprises a central body 11B and one radial arm 11C that extends radially inwards from the outer ring 11A. As can be clearly seen the opening 13A in the flap 13 of the membrane 12 has a larger diameter than the through hole 11D in the central body 11B. The through hole works as a timer passage.

There are different ways the stationary portion of the membrane can be fixed in the dosing device.

One possibility is that the membrane is welded directly to a portion of the valve seat, e.g. by ultrasonic welding or heat sealing.

There may be used a line shaped welding or spot welding.

Another option is that the membrane is fixed (e.g. welded, adhered) to a carrying ring that is snapped onto the back end of the dosing chamber such that membrane bears against the valve seat.

Yet another option is that the perimeter of the membrane is clamped between the valve seat (e.g. an outer ring thereof) and a clamp ring that is snapped onto the back end of the dosing chamber.

Another possibility is to provide one or more pins at a portion of the valve seat and provide a corresponding number of holes in the stationary portion of the membrane which tightly fit over the pins to fix the stationary portion of the membrane to the valve seat.

It is also possible to manufacture the membrane separately and attach the membrane and valve seat by laying the membrane in the injection mould, wherein the membrane is overmoulded while forming the valve seat.

The valve seat may have a flat shape as is shown in FIGS. 2-5. However, it is also possible that the valve seat has a slightly convex or concave shape at the side against which the membrane is attached. Thereby, the stationary portion of the membrane, which is attached to the convex or concave valve seat, will have the same convex or concave shape, which will cause a biasing force in the membrane material to keep the flap closed. Thereby a tighter sealing between the membrane and the valve seat can be achieved, which requires more force to be opened, but also provides inherently more force to reclose.

The invention claimed is:

1. A liquid dosing device to be mounted on a container for dispensing doses of liquid from said container, said dosing device comprising:
    a dosing chamber, said dosing chamber having a front end and a back end opposite to the front end;
    an outlet passage located at the front end of said dosing chamber;
    a plunger located in the dosing chamber and dividing the dosing chamber in a front space and a back space, said plunger being moveable in the dosing chamber between a forward position in which the plunger closes off the outlet passage and the front space has a minimal volume, and a backward position, in which the front space has a maximal volume;
    a dosing chamber inlet passage providing a fluid communication between the front space and the container in each position of the plunger, to allow liquid to flow from the container to the front space;
    a timer passage associated with the dosing chamber providing a fluid communication between the container and said back space in each position of the plunger, to allow liquid to flow from the container to the back space;
    a release passage associated with the dosing chamber, said release passage being greater than the timer passage and providing a fluid communication between the back space of the dosing chamber and the container to allow liquid to flow from the back space to the container;
    a valve assembly associated with the release passage, said valve assembly having a closed state in which the release passage is closed off and an open state in which said release passage is open and fluid is allowed to flow there through from the back space to the container; and wherein the valve assembly comprises a valve seat located at the back end of the dosing chamber and a membrane located on a side of the valve seat facing away from the back space, said membrane being made of an elastic foil having a uniform thickness, said membrane having a stationary portion that is fixed with respect to the valve seat and at least one moveable flap which is connected to the stationary portion by a hinge portion, wherein said flap in said open state of the valve assembly is moved away from the valve seat and in said closed state of the valve assembly bears against the valve seat, and wherein the hinge portion is elastically flexed when the flap is moved away from the valve seat and is in a rest state when the flap bears against the valve seat.

2. The liquid dosing device according to claim 1, wherein the foil is made of a polymeric material.

3. The liquid dosing device according to claim 2, wherein the foil is made of a polypropylene (PP).

4. The liquid dosing device according to claim 3, wherein the foil has a thickness in a range of 30-80 μm.

5. The liquid dosing device according to claim 2, wherein the foil is made of a thermoplastic elastomer (TPE).

6. The liquid dosing device according to claim 5, wherein the foil has a thickness in a range of 100-500 μm.

7. The liquid dosing device according to claim 2, wherein the foil is made of a polyethylene (PE).

8. The liquid dosing device according to claim 7, wherein the foil has a thickness in a range of 80-150 μm.

9. The liquid dosing device according to claim 1, wherein the membrane comprises a single flap.

10. The liquid dosing device according to claim 1, wherein the flap has a flap diameter and the hinge portion has a length that is about two thirds of the flap diameter.

11. The liquid dosing device according to claim 1, wherein the timer passage comprises a cutout provided in the membrane.

12. The liquid dosing device according to claim 11, wherein the cutout is formed as a timer opening formed as a hole.

13. The liquid dosing device according to claim 11, wherein said cutout is located in the moveable flap.

14. The liquid dosing device according to claim 11, wherein said cutout is located in the stationary portion of the membrane.

15. The liquid dosing device according to claim 11, wherein said cutout is invariant during normal use.

16. The liquid dosing device according to claim 1, wherein the timer passage is integrated in the valve seat.

17. The liquid dosing device according to claim 16, wherein the membrane has a cutout that is aligned with the timer passage in the valve seat.

18. The liquid dosing device according to claim 17, wherein the timer passage has a smaller diameter than the cutout in the membrane.

19. The liquid dosing device according to claim 17, wherein the valve seat has a support formation adapted to be a stop for the flap of the membrane.

20. The liquid dosing device according to claim 19, wherein the timer passage is provided in said support formation.

21. The liquid dosing device according to claim 20, wherein the support formation includes a central body and at least one radial arm extending from the central body and connected to an outer ring of the valve seat, wherein the timer passage is provided in the central body.

22. The liquid dosing device according to claim 1, wherein the timer passage is provided in a dosing chamber wall.

23. The liquid dosing device according to claim 1, wherein stationary portion, the movable flap and the hinge portion of the membrane are formed in one piece, wherein a contour of the flap and the hinge portion is provided by a cut in the membrane, and wherein the stationary portion comprises a ring shaped portion that circumvents the flap.

24. A closure cap attachable to a container, wherein in said closure cap a liquid dosing device for dispensing doses of liquid from said container is integrated, said dosing device comprising:
- a dosing chamber, said dosing chamber having a front end and a back end opposite to the front end;
- an outlet passage located at the front end of said dosing chamber;
- a plunger located in the dosing chamber and dividing the dosing chamber in a front space and a back space, said plunger being moveable in the dosing chamber between a forward position in which the plunger closes off the outlet passage and the front space has a minimal volume, and a backward position, in which the front space has a maximal volume;
- a dosing chamber inlet passage providing a fluid communication between the front space and the container in each position of the plunger, to allow liquid to flow from the container to the front space;
- a timer passage associated with the dosing chamber providing a fluid communication between the container and said back space in each position of the plunger, to allow liquid to flow from the container to the back space;
- a release passage associated with the dosing chamber, said release passage being greater than the timer passage and providing a fluid communication between the back space of the dosing chamber and the container to allow liquid to flow from the back space to the container;
- a valve assembly associated with the release passage, said valve assembly having a closed state in which the release passage is closed off and an open state in which said release passage is open and fluid is allowed to flow there through from the back space to the container;
- wherein the valve assembly comprises a valve seat located at the back end of the dosing chamber and a membrane located on a side of the valve seat facing away from the back space, said membrane being made of an elastic foil having a uniform thickness, said membrane having a stationary portion that is fixed with respect to the valve seat and at least one moveable flap which is connected to the stationary portion by a hinge portion, wherein said flap in said open state of the valve assembly is moved away from the valve seat and in said closed state of the valve assembly bears against the valve seat, and wherein the hinge portion is elastically flexed when the flap is moved away from the valve seat and is in a rest state when the flap bears against the valve seat.

25. A container containing substance selected from the group of liquid personal care products, liquid home and garden products, liquid food and beverage products, liquid laundry and homecare products, and liquid pharmaceutical products, said container being provided with a closure cap attached to the container, wherein in said closure cap a liquid dosing device for dispensing doses of liquid from said container is integrated, said dosing device comprising:
- a dosing chamber, said dosing chamber having a front end and a back end opposite to the front end;
- an outlet passage located at the front end of said dosing chamber;
- a plunger located in the dosing chamber and dividing the dosing chamber in a front space and a back space, said plunger being moveable in the dosing chamber between a forward position in which the plunger closes off the outlet passage and the front space has a minimal volume, and a backward position, in which the front space has a maximal volume;
- a dosing chamber inlet passage providing a fluid communication between the front space and the container in each position of the plunger, to allow liquid to flow from the container to the front space;
- a timer passage associated with the dosing chamber providing a fluid communication between the container and said back space in each position of the plunger, to allow liquid to flow from the container to the back space;
- a release passage associated with the dosing chamber, said release passage being greater than the timer passage and providing a fluid communication between the back space of the dosing chamber and the container to allow liquid to flow from the back space to the container;
- a valve assembly associated with the release passage, said valve assembly having a closed state in which the release passage is closed off and an open state in which said release passage is open and fluid is allowed to flow there through from the back space to the container;
- wherein the valve assembly comprises a valve seat located at the back end of the dosing chamber and a membrane located on a side of the valve seat facing away from the back space, said membrane being made of an elastic foil having a uniform thickness, said membrane having a stationary portion that is fixed with respect to the valve seat and at least one moveable flap which is connected to the stationary portion by a hinge portion, wherein said flap in said open state of the valve assembly is moved away from the valve seat and in said closed state of the valve assembly bears against the valve seat, and wherein the hinge portion is elastically flexed when the flap is moved away from the valve seat and is in a rest state when the flap bears against the valve seat.

26. A container provided with a liquid dosing device mounted on the container for dispensing doses of liquid from said container, said dosing device comprising:
- a dosing chamber, said dosing chamber having a front end and a back end opposite to the front end;
- an outlet passage located at the front end of said dosing chamber;
- a plunger located in the dosing chamber and dividing the dosing chamber in a front space and a back space, said plunger being moveable in the dosing chamber between a forward position in which the plunger closes off the outlet passage and the front space has a minimal volume, and a backward position, in which the front space has a maximal volume;
- a dosing chamber inlet passage providing a fluid communication between the front space and the container in each position of the plunger, to allow liquid to flow from the container to the front space;
- a timer passage associated with the dosing chamber providing a fluid communication between the container and said back space in each position of the plunger, to allow liquid to flow from the container to the back space;

a release passage associated with the dosing chamber, said release passage being greater than the timer passage and providing a fluid communication between the back space of the dosing chamber and the container to allow liquid to flow from the back space to the container;

a valve assembly associated with the release passage, said valve assembly having a closed state in which the release passage is closed off and an open state in which said release passage is open and fluid is allowed to flow there through from the back space to the container;

wherein the valve assembly comprises a valve seat located at the back end of the dosing chamber and a membrane located on a side of the valve seat facing away from the back space, said membrane being made of an elastic foil having a uniform thickness, said membrane having a stationary portion that is fixed with respect to the valve seat and at least one moveable flap which is connected to the stationary portion by a hinge portion, wherein said flap in said open state of the valve assembly is moved away from the valve seat and in said closed state of the valve assembly bears against the valve seat, and wherein the hinge portion is elastically flexed when the flap is moved away from the valve seat and is in a rest state when the flap bears against the valve seat.

27. The container according to claim 26, wherein said container is a squeeze type container.

28. The container according to claim 26, wherein said container is a pouring type container.

\* \* \* \* \*